(12) United States Patent
Mortazavi et al.

(10) Patent No.: US 9,942,324 B2
(45) Date of Patent: Apr. 10, 2018

(54) REBALANCING AND ELASTIC STORAGE SCHEME WITH ELASTIC NAMED DISTRIBUTED CIRCULAR BUFFERS

(71) Applicant: Futurewei Technologies, Inc., Plano, TX (US)

(72) Inventors: Masood Mortazavi, Santa Clara, CA (US); Chi Young Ku, San Ramon, CA (US); Guangyu Shi, Shenzhen (CN); Stephen Morgan, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 309 days.

(21) Appl. No.: 14/818,664

(22) Filed: Aug. 5, 2015

(65) Prior Publication Data
US 2017/0041393 A1 Feb. 9, 2017

(51) Int. Cl.
*H04L 29/08* (2006.01)
*G06F 3/06* (2006.01)

(52) U.S. Cl.
CPC .......... *H04L 67/1097* (2013.01); *G06F 3/067* (2013.01); *G06F 3/0619* (2013.01); *G06F 3/0656* (2013.01); *H04L 67/10* (2013.01)

(58) Field of Classification Search
CPC ..... H04L 67/1097; G06F 3/067; G06F 3/0631
See application file for complete search history.

(56) References Cited

U.S. PATENT DOCUMENTS

| | | | | |
|---|---|---|---|---|
| 4,758,944 A | * | 7/1988 | Bartley | G06F 12/023 |
| | | | | 711/160 |
| 5,873,089 A | * | 2/1999 | Regache | G06F 5/06 |
| 6,742,078 B1 | * | 5/2004 | Chien | G06F 3/0616 |
| | | | | 365/185.11 |

(Continued)

FOREIGN PATENT DOCUMENTS

| | | |
|---|---|---|
| CN | 103389941 A | 11/2013 |
| WO | 2012100087 A2 | 7/2012 |
| WO | 2012142512 A1 | 10/2012 |

OTHER PUBLICATIONS

"Facebook Builds Exabyte Data Centers for Cold Storage," http://www.datacenterknowlege.com/archives/2013/01/18/facebook-builds-new-data-centers-for-cold-storage, Jan. 18, 2013, pp. 1-4.

(Continued)

*Primary Examiner* — Midya Rojas
*Assistant Examiner* — Khoa D Doan
(74) *Attorney, Agent, or Firm* — Conley Rose, P.C.

(57) ABSTRACT

A method implemented by a network element (NE) in a network, comprising composing a first network storage entity by mapping a plurality of logical storage units to a plurality of physical storage units in a physical storage system according to a first storage metric associated with the plurality of physical storage units, arranging the plurality of logical storage units sequentially to form a logical circular buffer, and designating a current logical storage unit for writing data and an upcoming logical storage unit for writing data after the current storage unit is fully written, and (Continued)

rebalancing the physical storage system while the physical storage system is actively performing network storage operations by relocating at least one of the logical storage units to a different physical storage unit according to a second storage metric associated with the plurality of physical storage units.

14 Claims, 17 Drawing Sheets

(56) References Cited

U.S. PATENT DOCUMENTS

| | | | | |
|---|---|---|---|---|
| 8,756,361 | B1* | 6/2014 | Carlson | G11B 20/10527 711/200 |
| 8,954,664 | B1* | 2/2015 | Pruett | G06F 11/1435 711/112 |
| 2002/0049815 | A1* | 4/2002 | Dattatri | G06Q 30/06 709/206 |
| 2003/0041164 | A1* | 2/2003 | Denecheau | H04L 12/433 709/232 |
| 2003/0088747 | A1* | 5/2003 | Nobuyoshi | G06F 3/0607 711/162 |
| 2004/0039875 | A1* | 2/2004 | Kuwata | G06F 3/0605 711/114 |
| 2004/0215884 | A1* | 10/2004 | Lambright | G06F 12/0866 711/130 |
| 2004/0267959 | A1* | 12/2004 | Cochran | H04L 41/0893 709/239 |
| 2005/0071597 | A1* | 3/2005 | Lee | G06F 9/4428 711/170 |
| 2005/0172067 | A1* | 8/2005 | Sinclair | G06F 3/0613 711/103 |
| 2007/0106844 | A1* | 5/2007 | Ohkawa | G06F 15/16 711/130 |
| 2010/0312985 | A1* | 12/2010 | Rostedt | G06F 11/3636 711/206 |
| 2011/0208979 | A1* | 8/2011 | Saarinehn | G06F 21/78 713/193 |
| 2011/0320687 | A1* | 12/2011 | Belluomini | G06F 12/0804 711/103 |
| 2013/0151646 | A1* | 6/2013 | Chidambaram | H04L 47/6205 709/213 |
| 2013/0254514 | A1 | 9/2013 | Yu et al. | |
| 2016/0070535 | A1* | 3/2016 | Karr | G06F 9/5016 711/110 |

OTHER PUBLICATIONS

"Glacier: Cold Cloud Storage From Amazon," http://www.datacenterknowledge.com/archives/2012/08/21/amazon-glacier-cold-cloud-storage, Aug. 21, 2012, pp. 1-3.

Partial English Translation and Abstract of Chinese Patent Application No. CN103389941, Nov. 13, 2013, 12 pages.

Foreign Communication From a Counterpart Application, PCT Application No. PCT/CN2016/091773, International Search Report dated Oct. 31, 2016, 4 pages.

* cited by examiner

REBALANCING AND ELASTIC STORAGE SCHEME WITH ELASTIC NAMED DISTRIBUTED CIRCULAR BUFFERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The growth of the internet of things (IoT) is expected to result in a drastic increase in the amount of data available to describe the world. As the amount of data increases, users seek to preserve and/or protect the data with backups and replications, driving the demand for storage even higher. One approach to meeting the growing demand for data storage is to add additional storage units (e.g., storage disks) and/or optimize storage capacity. The addition of additional storage units to an online storage system may result in a significant challenge for rebalancing data storage or redistributing data across storage units. In addition, an increased amount of stored data in a storage unit may lead to performance deterioration, such as read and/or write throughputs and/or latencies. As such, performance optimization may be another goal for rebalancing data storage in addition to storage capacity distribution. In addition, IoT data often comprises diminishing level of interest over time. Thus, elasticity may be another important aspect for data.

SUMMARY

In one embodiment, the disclosure includes a method implemented by a network element (NE) in a network, comprising composing a first network storage entity by mapping a plurality of logical storage units to a plurality of physical storage units in a physical storage system according to a first storage metric associated with the plurality of physical storage units, arranging the plurality of logical storage units sequentially to form a logical circular buffer, and designating a current logical storage unit for writing data and an upcoming logical storage unit for writing data after the current storage unit is fully written, and rebalancing the physical storage system while the physical storage system is actively performing network storage operations by relocating at least one of the logical storage units to a different physical storage unit according to a second storage metric associated with the plurality of physical storage units.

In another embodiment, the disclosure includes an apparatus comprising a receiver configured to couple to a plurality of physical storage units via a storage network, receive a storage request message comprising a request to create a network storage entity, and receive a storage resize message comprising a request to adjust a storage capacity of the network storage entity, and a processor coupled to the receiver and configured to compose the network storage entity according to the storage request message by mapping a plurality of logical storage units to a portion of the plurality of physical storage units according to a storage metric, and arranging the logical storage units sequentially to form a logical circular buffer, and adjust the storage capacity of the network storage entity dynamically according to the storage resize message by adjusting a number of the logical storage units in the logical circular buffer.

In another embodiment, the disclosure includes an apparatus comprising a receiver configured to couple to a plurality of physical storage units in a storage network, and receive a storage request message comprising a request to create a network storage entity, and a processor coupled to the receiver and configured to assign a plurality of logical storage units distributed across the physical storage units to the network storage entity according to the storage request message, generate a metadata to associate the network storage entity, the logical storage units, and the physical storage units, wherein the metadata comprises a circular link list that associates the plurality of logical storage units to form a logical circular buffer and a mapping between the logical storage units and the physical storage units, rebalance the plurality of physical storage units by relocating at least one logical storage unit from a first of the physical storage units to a second of the physical storage units, and update the metadata according to relocation of the logical storage unit.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
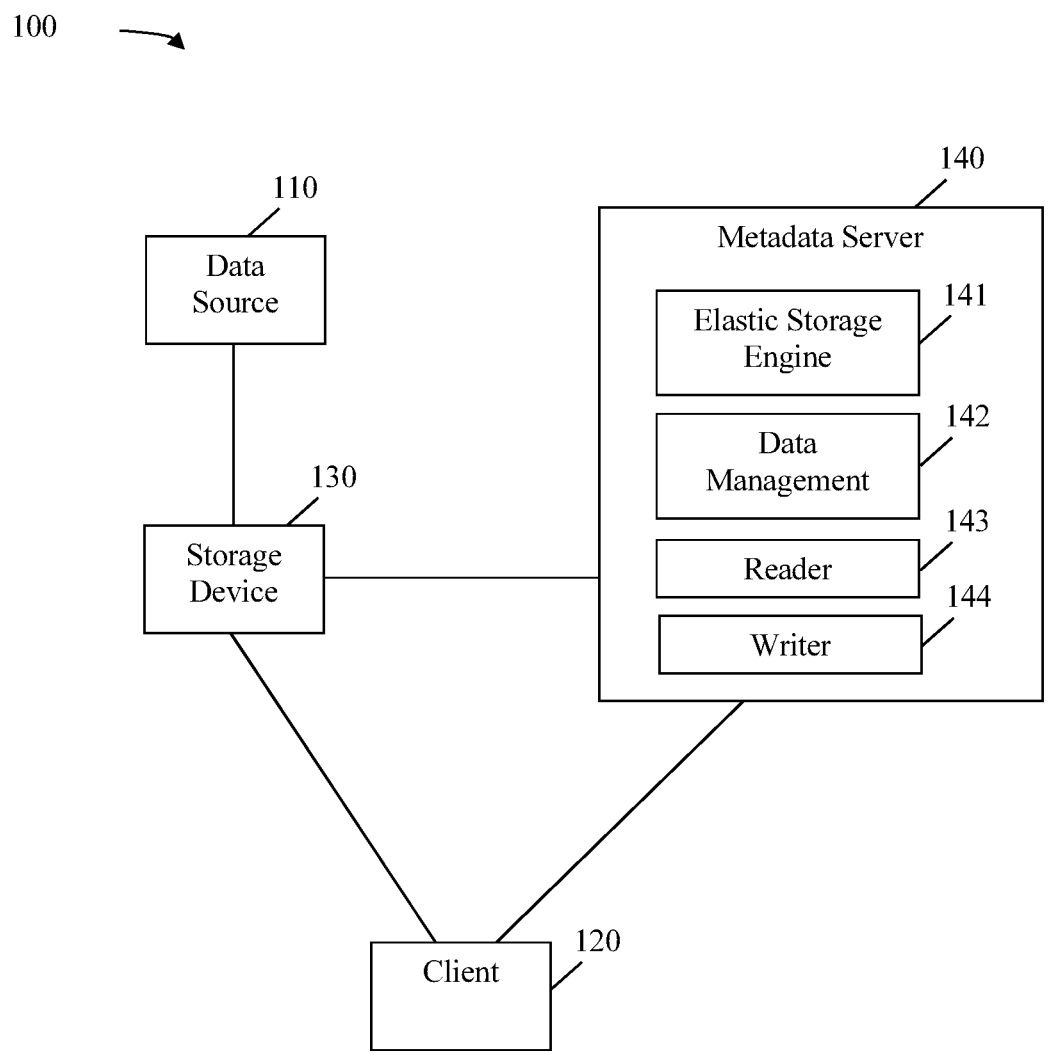
FIG. 1 is a schematic diagram of an embodiment of a storage network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for rebalancing an online storage system. An online storage system refers to a storage system in a connectivity state actively providing data storage services and performing network data storage operations. The disclosed embodiments decouple logical data storage from physical data storage in the data storage system by employing distributed circular buffer elements. The disclosed embodiments provide a set of primitive functions for building elastic data storage and rebalancing data storage. The primitive functions include buffer element target selection, buffer element relocation, buffer expansion, and buffer contraction. The primitive functions are run-time or online operations, which may be applied and/or executed on a storage while the storage is online and in service. The disclosed embodiments define an elastic data storage entity in the form of a logical circular buffer by composing a circular linked list of buffer elements or logical storage units that are mapped to physical storage units, which are persistent storages. Thus, the logical circular buffer is referred to as a persistent circular buffer. Persistent circular buffers allow for managed dissipation of data that comprises a diminishing level of interest over time. The persistent circular buffers, which are the elastic storage entities of interest, are named entities which are identified by global names such as a uniform resource identifier (URI), accessible to system clients. The elements are also named and have global identifiers. The association between the buffer elements, the physical storage units, and the elastic storage entity is tracked and maintained by a metadata server. The buffer elements are append-only buffer elements, where append-only refers to the writing of data continued from a previous write location. The disclosed embodiments define three types of buffer elements, SEs, current append frontier elements (CAFEs), and UAFEs. An SE is a buffer element that is full and does not accept additional data writes. For example, a seal may be appended to a buffer element that is full. A CAFE is a buffer element that is not full and is currently accepting data writes. An UAFE is a buffer element for future data writes. In a logical circular buffer, a CAFE is positioned between an SE and an UAFE. To build the logical circular buffer, a target UAFE is selected while the CAFE is being filled. When the CAFE is full, the CAFE transitions to an SE and the UAFE transitions to a CAFE. The logical circular buffer building process is repeated until the logical circular buffer comprises a desired storage capacity. The disclosed embodiments simplify the tracking of data writes by allowing only SEs to be relocated to different physical storage locations, but not CAFEs. In an embodiment, a physical storage location may be selected for an UAFE or for an SE relocation by employing various types of optimization schemes, for example, based on storage capacity and/or storage performance of the physical storage units. The disclosed embodiments enable concurrent intra-buffer rebalancing and inter-buffer rebalancing. Inter-buffer rebalancing refers to the rebalancing of multiple SEs located in a single physical storage unit from different circular buffers. Intra-buffer rebalancing refers to the rebalancing of multiple SEs located in a single physical storage unit from the same circular buffer. The disclosed embodiments may be applied for rebalancing and/or redistributing storage capacity and/or storage performance. The disclosed embodiments may be suitable for any types of storage devices, operating environments, and/or indexing schemes.

FIG. 1 is a schematic diagram of an embodiment of a storage network 100. Network 100 comprises a data source 110, a client 120, a storage device 130, and a metadata server 140. The storage device 130 and the metadata server 140 may correspond to components of a data center (DC) and/or a service provider that provides data storage services. The client 120 may be a user of the data storage services or a tenant of the DC. For example, a client 120 initially provides a data storage specification to a data storage service provider. The data storage specification may include storage capacity requirements, storage performance requirements, storage types, and/or other storage related requirements. Subsequently, the client 120 may request the provider to store data from the data source 110 to the storage device 130. The client 120 may also query data stored at the storage device 130.

The data source 110 comprises any device configured to capture data and forward an associated bit-stream to the storage device 130. For example, the data source 110 may comprise a video and/or audio monitoring system, an IoT device comprising a sensor, a DC that captures data on system status/utilization, a mobile network that captures data on system status/utilization, etc. Accordingly, the bit-stream comprises data records that comprise any of a diverse array of data such as media (e.g. video and/or audio data), sensor data, and/or any other type of time series data that is substantially continuously monitored. The data records may also comprise other information associated with the data, such as temperature, current, device utilization, or any other attribute relevant to the data. In some embodiments, the data may comprise a bounded life. For example, the data may become less important or less interesting to a user over time.

The storage device 130 may be any device suitable for storing data. The storage device 130 may comprise a plurality of physical storage units, which may include storage class memory (SCM), non-volatile memory (NVM), solid state drivers (SSDs), hard disk drives (HDDs), and/or shingled magnetic recordings (SMRs). The storage device 130 is configured to receive a bit-stream from the data source 110 and store the received bit-stream, for example, as data segments. In some embodiments, the storage device 130 may additionally perform data compression to optimize storage usage.

The metadata server 140 is a virtual machine (VM), a server machine, or any device configured to manage the storage device 130. The metadata server 140 manages the writing of data to the storage device 130, the reading of data from the storage device 130, and the rebalancing of the storage device 130. Rebalancing may include storage capacity redistribution and storage load and/or performance redistribution. The metadata server 140 comprises an elastic storage engine 141, a data management component 142, a reader 143, and a writer 144. The elastic storage engine 141 is configured to determine locations at which data may be stored on the storage device 130 and the organizations of data on the storage device 130. In an embodiment, the elastic storage engine 141 decouples the logical storage and the physical storage of data on the storage device 130. For example, the elastic storage engine 141 defines logical storage units and maps the logical storage units to the physical storage units of the storage device 130. The logical storage units may comprise the same size and/or different sizes. In an embodiment, the elastic storage engine 141 may logically divide a physical storage unit into multiple logical storage units. The elastic storage engine 141 may further link several logical storage units depending on the amount of storages required by the client 120. For example, the elastic storage engine 141 assigns a plurality of logical storage units to a client 120 and presents the plurality of logical storage units to the client 120 as a single storage entity by employing a circular linked list technique, as described more fully below. It should be noted that although the elastic storage engine 141 is shown as an internal component to the metadata server 140, the elastic storage engine 141 may be configured as an external component to the metadata server 140. For example, the elastic storage engine 141 may correspond to another VM or device communicatively coupled to the metadata server 140.

The data management component 142 is configured to maintain metadata associated with the logical storage units, the physical storage units, and the storage entities defined by the elastic storage engine 141. The metadata may include global addresses of the physical storage units, a mapping between the logical storage units and the physical storage units, links and/or relationships (e.g., in the form of circular linked lists) between the logical storage units, a mapping between the logical storage units and the storage entity assigned to the client 120, and statuses of the logical storage units and/or the physical storage units, as discussed more fully below.

The reader 143 is configured to receive queries from the client 120 and interact with the data management component 142 and the storage device 130 to respond to queries received from the client 120, as discussed more fully below. In some embodiments, the client 120 sends queries directly to the metadata server 140. In some other embodiments, the client 120 sends queries to the storage device 130 and the storage device 130 interacts with the reader 143 and the data management component 142 to provide the requested data.

The writer 144 is configured to receive write requests from the client 120 and interact with the data management component 142 and the elastic storage engine 141 to write data to the storage device 130. In some embodiments, the client 120 sends write requests directly to the metadata server 140. In some other embodiments, the client 120 sends write requests to the storage device 130 and the storage device 130 interacts with the writer 144 and the data management component 142 to write the data to the storage device 130.

While the storage device 130 is online and in service, the physical configuration of the storage device 130 may be updated. For example, the client 120 may request to increase storage capacity after a storage entity is built for the client 120. Alternatively, an older or lower performance physical storage unit may be removed and a newer or better performance physical storage unit may be added. As such, dynamic rebalancing of data may be important for data storage management. Rebalancing refers to the process of relocating existing data, selecting target physical storage units for relocating the existing data or for storing future data, and/or resizing (e.g., expanding or shrinking) the amount of physical storages required by a particular client 120.

Figure 2:
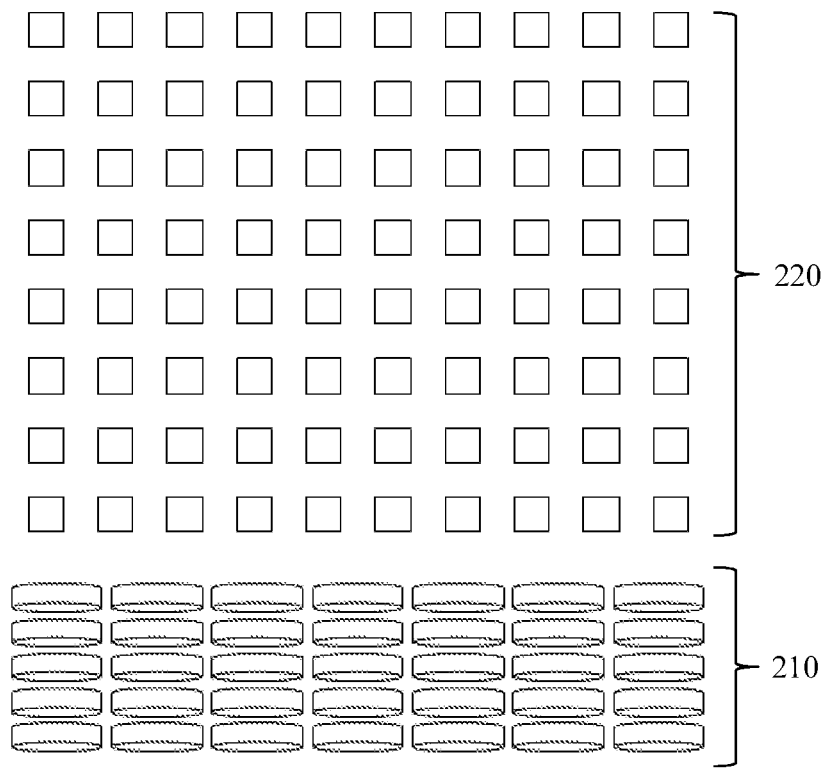
FIG. 2 is a schematic diagram of an embodiment of a storage architecture that decouples logical and physical storage of data.

FIG. 2 is a schematic diagram of an embodiment of a storage system 200 architecture that decouples logical and physical storage of data. The system 200 comprises a plurality of physical storage units 210, which may correspond to a storage device, such as the storage device 130. For example, the physical storage units 210 may be a storage disk, such as an SCM, a NVM, an SSD, a HDD, or a SCM. The system 200 decouples the logical and the physical storage of data by defining a plurality of logical storage units 220 and mapping the logical storage units 220 to the physical storage units 210. Each logical storage unit 220 corresponds to a buffer element and may refer to the smallest unit of storage allocation in the system 200. In some embodiments, the logical storage units 220 are append-only buffers, where a data write may continue from a previous write location. The logical storage units 220 may be mapped to the physical storage units 210 by employing several mechanisms. For example, a single physical storage unit 210 may be logically split into multiple logical storage units 220. Alternatively, a single logical unit 220 may be mapped to a portion of one physical storage unit 210 and a portion of another physical storage unit 210. Each of the logical storage units 220 may comprise the same storage capacity or a different storage capacity. When a DC or a data storage server provider employs the system 200 architecture, a client, such as the client 120, is assigned with one or more logical storage units 220 distributed over the physical storage units 210. The logical storage units 220 may be logically linked together to form a circular buffer and may be represented as a single storage entity, as described more fully below.

Figure 3:
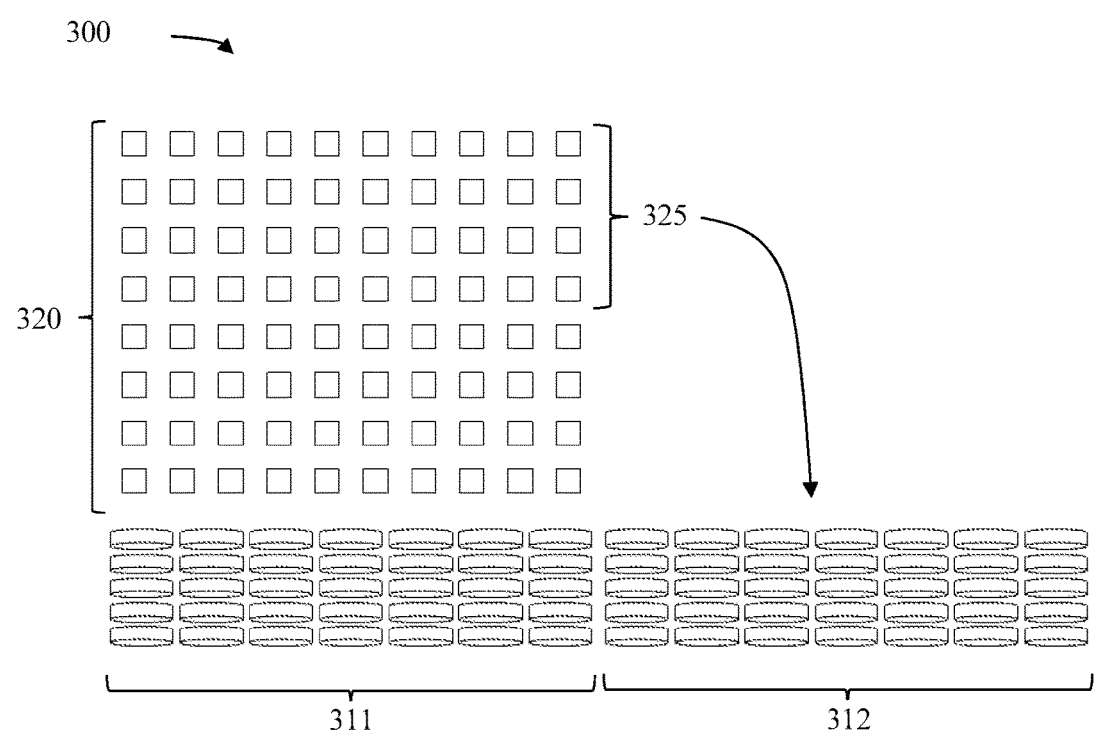
FIG. 3 is a schematic diagram of an embodiment of a storage system that rebalances data storage.

FIG. 3 is a schematic diagram of an embodiment of a storage system 300 that rebalances data storage. The system 300 is similar to the storage device 130 and employs a similar storage architecture as the system 200. The system 300 initially comprises a plurality of first physical storage units 311 and a plurality of logical storage units 320 mapped to the first physical storage units 311. The logical storage units 320 are similar to the logical storage units 220. The first physical storage units 311 are similar to the physical storage units 210. Subsequently, a plurality of second physical storage units 312 similar to the physical storage units 210 and 311 are added to the system 300. To rebalance data storage, a portion 325 of the logical storage units 320 may be relocated (shown by the arrow) to the second physical storage units 312, for example, to improve data read and/or write performances. The challenges of data storage rebalancing may include load rebalancing, storage resizing, and capacity adjustment while the system 300 is online. Load rebalancing refers to the relocation and/or distribution of the logical storage units 320 for optimizing read and/or write throughput and capacity usage. Storage resizing refers to the expansion of storage capacity when additional physical storage units, such as the second physical storage units 312 are added into the system 300. Capacity adjustment refers to adjusting the amount of storage assigned to a particular tenant or client, such as the client 120. The decisions of data storage rebalancing may depend on several factors, such as the types of data and/or applications and the types of storage system 300 that is in use and/or the objective functions and/or optimization parameters (e.g., heat measures, capacity measures, and/or power measures) optimization parameters).

Figure 4:
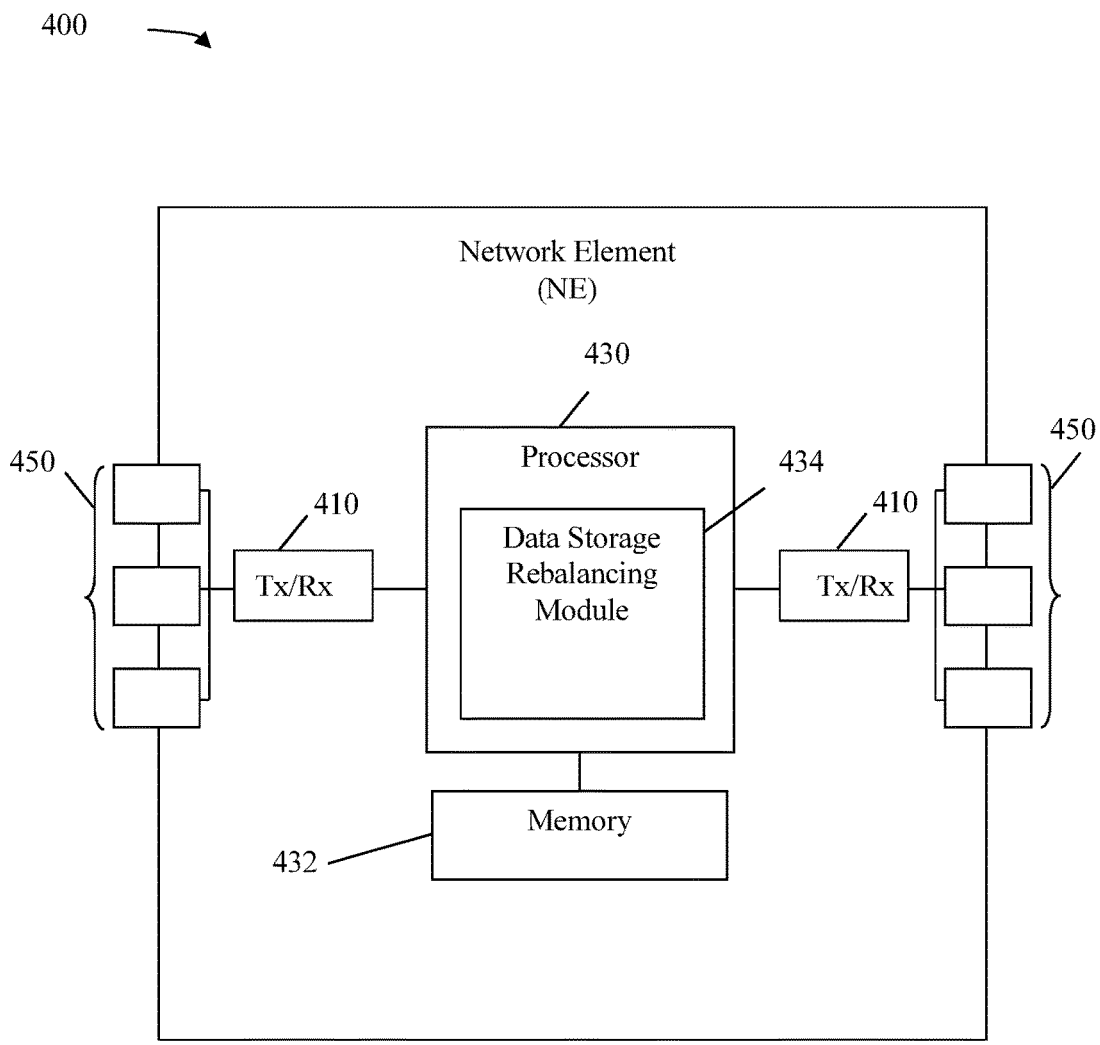
FIG. 4 is a schematic diagram of an embodiment of an NE configured to rebalance data storage.

FIG. 4 is a schematic diagram of an embodiment of an NE 400 acting as a node in a storage network, such as the network 100. For example, the NE 400 may be configured to act as a storage device, such as the storage device 130, a metadata server, such as the metadata server 140. The NE 400 may be configured to implement and/or support data storage rebalancing while a storage system is online as described herein. NE 400 may be implemented in a single node or the functionality of NE 400 may be implemented in a plurality of nodes in a network. One skilled in the art will recognize that the term NE encompasses a broad range of devices of which NE 400 is merely an example. NE 400 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 400. For instance, the features/methods in the disclosure may be implemented using hardware, firmware, and/or software installed to run on hardware. The NE 400 may be any device that processes, stores, and/or forwards data frames through a network, e.g. a server, a client, a data source, etc. As shown in FIG. 4, the NE 400 may comprise transceivers (Tx/Rx) 410, which may be transmitters, receivers, or combinations thereof. Tx/Rxs 410 may be coupled to a plurality of ports 450 (e.g. upstream interfaces and/or downstream interfaces) for transmitting and/or receiving frames from other nodes. A processor 430 may be coupled to the Tx/Rxs 410 to process the frames and/or determine which nodes to send frames to. The processor 430 may comprise one or more multi-core processors and/or memory devices 432, which may function as data stores, buffers, etc. Processor 430 may be implemented as a general processor or may be part of one or more application specific integrated circuits (ASICs) and/or digital signal processors (DSPs). Processor 430 may comprise a data storage rebalancing module 434, which may perform methods 900, 1100, 1300, 1500, 1600, and/or 1700, depending on the embodiment. As such, the inclusion of the data storage rebalancing module 434 and associated methods and systems provide improvements to the functionality of a storage network. Further, the data storage rebalancing module 434 effects a transformation of a particular article (e.g., a storage device such as the storage device 130) in the storage network to a different state (e.g., loads and capacity). In an alternative embodiment, the data storage rebalancing module 434 may be implemented as instructions stored in memory 432, which may be executed by processor 430, for example as a computer program product. In another alternative embodiment, the data storage rebalancing module 434 may be implemented on separate NEs.

It is understood that by programming and/or loading executable instructions to the NE 400, at least one of the processor 430, the data storage rebalancing module 434, ports 450, Tx/Rxs 410, and/or memory 432 are changed, transforming the NE 400 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 5:
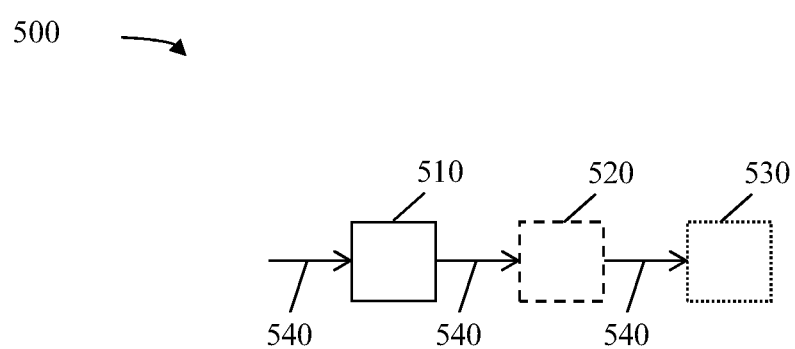
FIG. 5 is a schematic diagram of an embodiment of a storage scheme that employs distributed storage elements.

FIG. 5 is a schematic diagram of an embodiment of a storage scheme 500 that employs distributed storage elements. The storage scheme 500 may be employed by a storage system, such as the network 100, the systems 200 and/or 300. The scheme 500 comprises an SE 510 (shown as a solid box), a CAFE 520 (shown as a dashed box), and an UAFE 530 (shown as a dotted box). The SE 510, the CAFE 520, and the UAFE 530 are append-only storage elements or buffer elements. The SE 510, the CAFE 520, and the UAFE 530 may correspond to the logical storage units 220 and 320 and may be assigned and distributed across a plurality of physical storage units, such as the physical storage units 210, 311, and 312. The SE 510 is a buffer element that is full. For example, a seal may be appended to a buffer element to indicate that the buffer element is full. Thus, an SE 510 may not accept additional data writes. The CAFE 520 is a buffer element currently accepting data writes and is referred to as an open element. For example, a write pointer may be employed to track a last data write location so that new data may be appended to a buffer element at the last data write location. The UAFE 530 is a buffer element for future data writes. For example, the UAFE 530 is a buffer element selected (e.g., based on some object functions) for accepting future data writes after the CAFE 520 is full and transitions to an SE, such as the SE 510. The SE 510, the CAFE 520, and the UAFE 530 are distributed over a plurality of physical storage units, such as the physical storage units 210, 311, and 312.

In the scheme 500, an elastic storage entity is built from an ordered sequence of buffer elements. For example, the CAFE 520 is positioned between the SE 510 and the UAFE 530. The ordered sequence is tracked and/or maintained by a plurality of links 540 that interconnects the SE 510, the CAFE 520, and the UAFE 530. However, the SE 510, the CAFE 520, and the UAFE 530 are not physically linked by the links 540 or embedded with any pointers that represent the links 540. Instead, the ordered sequence is a logical relationship between the SE 510, the CAFE 520, and the UAFE 530 and maintained by a metadata server, such as the metadata server 140, for example, in the form of metadata.

To build the elastic storage entity, a target physical location is selected for the UAFE 530 while the CAFE 520 is being filled. When the CAFE 520 is full, the CAFE 520 transitions to an SE 510, the UAFE 530 transitions to a CAFE 520, and another target physical location may be selected for a next UAFE 530. The building process is repeated until the elastic storage entity comprises a desired storage capacity.

Figure 6:
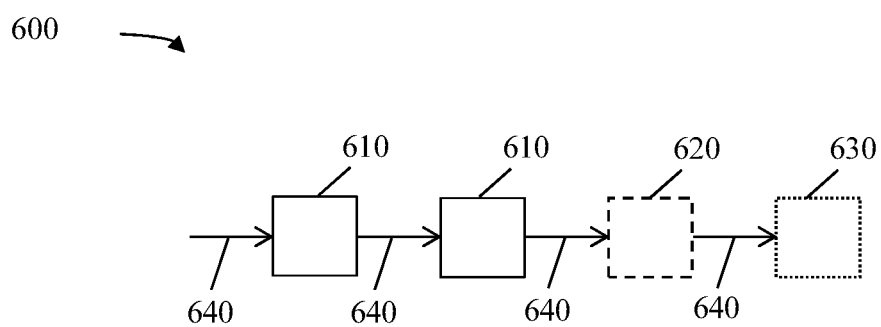
FIG. 6 is a schematic diagram of an embodiment of a configuration of an incomplete distributed circular buffer.

FIG. 6 is a schematic diagram of an embodiment of a configuration of an incomplete distributed circular buffer 600. The circular buffer 600 comprises a plurality of SEs 610 similar to the SE 510, a CAFE 620 similar to the CAFE 520, and an UAFE 630 similar to the UAFE 530. The SEs 610, the CAFE 620, and the UAFE 630 are interconnected by a plurality of links 640 similar to the links 540. The configuration shown corresponds to a scenario while a storage network, such as the network 100, is building up a storage entity for a client, such as the client 120. The buffer 600 is referred to as an incomplete circular buffer since the buffer 600 may continue to expand by adding UAFEs 630 until the buffer 600 comprises a desired storage capacity.

Figure 7:
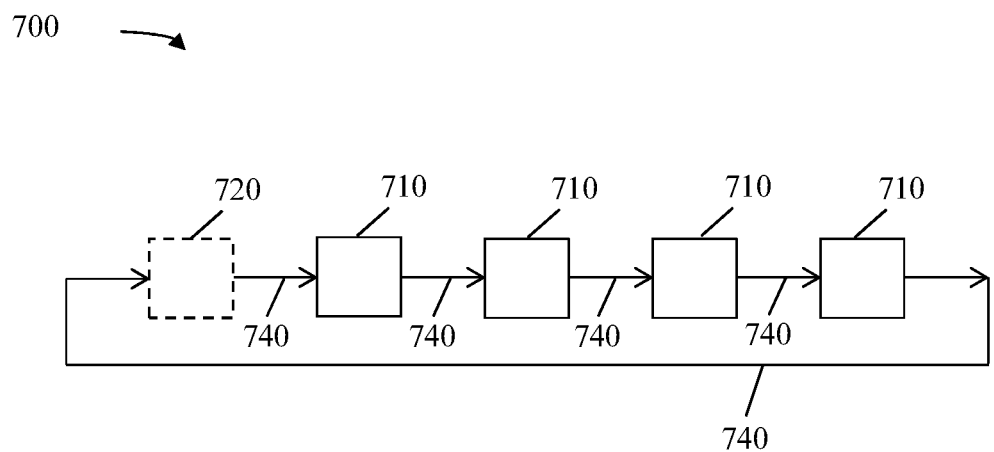
FIG. 7 is a schematic diagram of an embodiment of a configuration of a complete distributed circular buffer.

FIG. 7 is a schematic diagram of an embodiment of a configuration of a complete distributed circular buffer 700. The buffer 700 comprises a plurality of SEs 710 similar to the SEs 510 and 610 and a CAFE 620 similar to the CAFEs 520 and 620 interconnected by links 740 similar to the links 540 and 640. The configuration shown corresponds to a scenario when a storage network, such as the network 100, has completed building up a storage entity for a client, such as the client 120. The completion of the storage entity refers to the network assigning an amount of data storage that meets the requirement or the data specification of the client. Thus, the buffer 700 is a complete circular buffer, where the links 740 circularly linked the SEs 710 and the CAFE 720. It should be noted that the use of a logical circular buffer enables the oldest data to be overwritten once the CAFE 720 is fully written. For example, once CAFE 720 is full, the SE 710 immediately after the CAFE 720 may first transition to an UAFE and then to a CAFE 720 and the oldest data in the buffer 700 may be overwritten with new data. As such, the buffer 700 is suitable for storing bounded life data, which comprises decreasing user interest over time.

The disclosed embodiments define a set of rules for providing elastic data storage and rebalancing data storage. Firstly, any SE, such as the SEs 510, 610, and 710, may be reassigned or relocated by copying the data stored in the SE from one physical location to another physical location. In addition, multiple SEs may be reassigned simultaneously. The reassignment of SEs rebalances both data storage and read load. The reassignment of SEs dynamically absorbs and/or sheds resources. Secondly, a CAFE, such as the CAFEs 520, 620, and 720, may not be reassigned or relocated at any time in order to avoid transaction loggings and/or other complicated failure recovery mechanisms. Thirdly, an UAFE, such as the UAFEs 530 and 630, is selected to provide the best assignment in terms of write load rebalancing. Similarly, the selection of UAFE dynamically absorbs and/or sheds resources. It should be noted that the complexity involved in relocating the CAFEs may outweigh the gain or benefits from the relocation, thus the disclosed embodiments do not relocate the CAFEs in order to simplify the rebalancing mechanisms.

As described above, a metadata server, such as the metadata server 140, is configured to manage a storage device, such as the storage device 130, in a storage network, such as the network 100. The metadata server acts as a command and control center for buffer element (e.g., logical storage units) redistribution and rebalancing. In an embodiment, the metadata server maintains a mapping between logical storage units, such as the logical storage units 220 and 320, and physical storage units, such as the physical storage units 210, 311, and 312, in the storage device. For example, each buffer element or each logical storage unit, such as the SEs 510, 610, 710, and 810, the CAFEs 520, 620, 720, and 820, and the UAFEs 530, 630, and 830, is identified by a buffer element identifier (ID), which may be globally unique across named circular buffers. The physical storage unit that is mapped to by the buffer element or the logical storage unit is identified by a global storage ID, which may be represented in the form of an URI and an address, as well. The following table shows an example of a mapping between a buffer element or a logical storage unit and a physical storage unit:

TABLE 1

| Mapping between a buffer element and a physical storage unit | |
| --- | --- |
| Buffer Element ID | Global Storage ID |
| URI for a circular buffer Sequence Number | An ordered set of Buffer Element IDs Address |

In another embodiment, the metadata server maintains and tracks statuses and metrics of the physical storage units. For example, each physical storage unit may be identified by a storage ID, which may be described by an URI. Some examples of statuses may include a loaded status, a not loaded status, an engaged in rebalancing status, a ready to accept load status, a power on status, and a power off status. A loaded status indicates that a physical storage unit comprises stored data. A not loaded status indicates that a physical storage unit is empty (e.g., no stored data). An engaged in rebalancing status indicates that a physical storage unit is in the process of copying data in and/or out of the physical storage unit. A ready to accept load status indicates that a physical storage unit is part of a storage system managed by the metadata server and is ready to receive and store data. A power on status indicates that a physical storage unit is powered-on or online. A power off status indicates that physical storage unit is powered-off or offline. It should be noted that a physical storage unit may be powered-on or powered-off according to some power saving schemes. For example, under some capacity conditions, data may be relocated such that fewer physical storage units may be powered on. In an embodiment, the statuses may be represented in the form of flags. A logical or operation on may be applied the flags to indicate multiple statuses. For example, a physical storage unit may be loaded and engaged in rebalancing. However, some flag values may not be OR-ed. For example, a physical storage unit may not be powered-off and engaged in rebalancing. Thus, it is important to check that the flag values are consistent. For example, the metadata server may perform anti-entropy scans to ensure flag values remain consistent with physical state over long spans of time, where anti-entropy scans enable drift and/or consistency repairs. The following table shows some examples of status flags for a physical storage unit:

TABLE 2

Examples of Status Flags for a Physical Storage Unit

| Status Flags | Descriptions |
| --- | --- |
| Loaded | Physical storage unit has stored data |
| NotLoaded | Physical storage unit has no stored data |
| EnagedInRebalancing | Physical storage unit is copying data into and/or out of the physical storage unit |
| ReadyToAcceptLoad | Physical storage unit is part of a metadata system and ready to receive and store data |
| PowerOn | Physical storage unit is powered-on (e.g., online) |
| PowerOff | Physical storage unit is powered-off (e.g., offline) |

In yet another embodiment, the metadata server maintains and tracks metrics, such as heat profiles and/or utilization profiles, of the physical storage units. For example, heat profiles may be measured in terms of input/output (IO) heat or temperatures of the physical storage units. IO heat refers to read and/or write activities (e.g., frequencies and/or amount of transfer) that occur at a physical storage unit. Utilization profiles measure the amount of storage capacity used and/or available.

In yet another embodiment, the metadata server maintains and tracks circular link lists that represent interconnections of logical storage units in storage entities. As described above, each storage entity is represented by a list of buffer elements or logical storage units circularly linked by links, such as the links 540, 640, and 740.

The disclosed embodiments define a set of primitive operations for providing elastic data storage and rebalancing data storage. The primitive operations include UAFE target selection, SE relocation, buffer expansion, and buffer contraction, as discussed more fully below. The primitive operations enable rebalancing in a microscopic scale and may be combined and/or performed in parallel to provide macroscopic rebalancing.

Figure 8A:
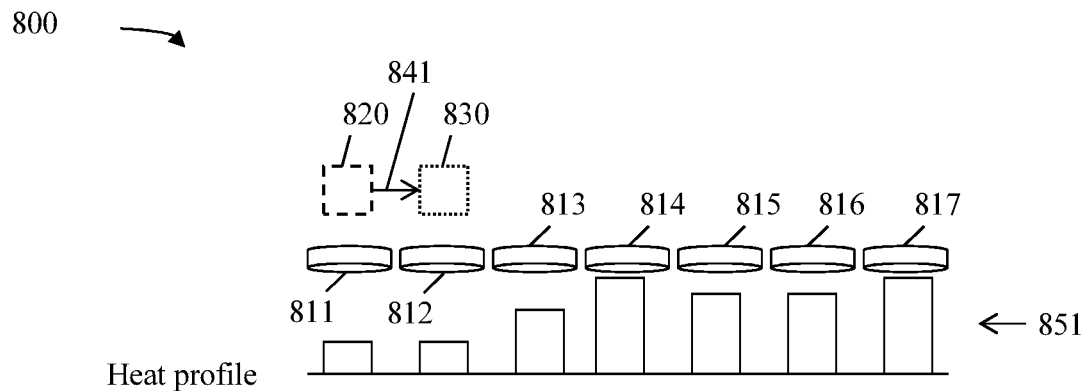
FIG. 8A illustrates an embodiment of an initial upcoming append frontier element (UAFE) target selection scenario.
Figure 8B:
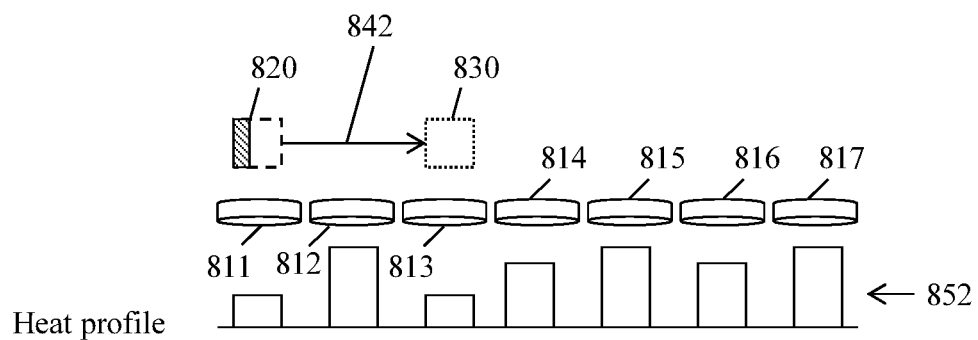
FIG. 8B illustrates an embodiment of an UAFE target re-selection scenario.
Figure 8C:
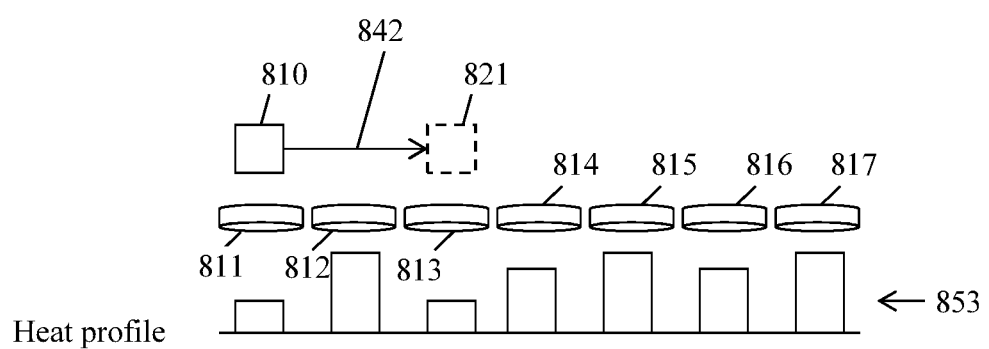
FIG. 8C illustrates an embodiment of an UAFE target selection completion scenario.

FIGS. 8A-8C illustrate an embodiment of an UAFE target selection scheme 800. The scheme 800 is implemented by a metadata server, such as the metadata server 140, in a storage network, such as the network 100. The scheme 800 is implemented when building up a storage entity for a client, such as the client 120. For example, the storage entity may be in the form of a circular buffer, such as the circular buffers 600 and 700. As shown, the scheme 800 is applied to a storage device similar to the storage device 130 comprising a plurality of physical storage units 811, 812, 813, 814, 815, 816, and 817 similar to the physical storage units 210, 311, and 312. The scheme 800 is divided into an initial selection stage, a re-selection stage, and a completion stage. The initial selection stage begins immediately after a CAFE 820 similar to the CAFEs 520, 620, and 720 is initialized and ready to accept data. As shown, the CAFE 820 is mapped to the physical storage unit 811.

FIG. 8A illustrates an embodiment of an initial UAFE target selection scenario. For example, the selection is performed by optimizing heat metrics. As shown, the physical storage units 811-817, each comprises a heat metric illustrated in a heat profile 851. Based on the heat profile 851, the physical storage unit 812 comprising the minimum heat metric is selected for an UAFE 830 similar to the UAFEs 530 and 630. After selecting the physical storage unit 812 for the UAFE 830, the metadata server may update metadata associated with the UAFE 830 and the target physical storage unit 812. The metadata associated with the UAFE 830 may include data similar to the buffer element ID described in Table 1 and a buffer link 841 similar to the links 540, 640, and 740, that links the CAFE 820 to the UAFE 830. The metadata associated with the physical storage unit 812 may include storage address as described in the Table 1, heat profile update based on some expected or estimated IO activities associated with the UAFE 830.

FIG. 8B illustrates an embodiment of an UAFE target re-selection scenario. For example, the re-selection is applied when the CAFE 820 reaches a certain buffer threshold. As shown, the CAFE 820 is about 30 percent (%) filled (shown as partial pattern filled). The re-selection is performed to refine and/or optimize the initial selection. For example, the heat metrics of the physical storage units 811-817 may change since the initial selection due to changes in IO activities. As shown, the physical storage units 811-817 comprise an updated heat profile 852. By comparing the heat profile 851 and the updated heat profile 852, the heat metric for the previously selected physical storage unit 812 has increased and no longer comprises the minimum heat metric. Instead, the physical storage unit 813 comprises the minimum heat metric. Thus, the physical storage unit 813 is selected for the UAFE 830. Similar to the initial selection, the metadata server updates metadata according to the re-selection. For example, the link 841 is updated to a link 842, which connects the UAFE 830 mapped to the physical storage unit 813. It should be noted that the re-selection process may be repeated when the CAFE 820 reaches a higher buffer threshold (e.g., at about 70% filled). In some embodiments, the number of iterations and/or the buffer thresholds may be determined by employing a gradient descent technique and an objective function that minimizes the overall system imbalances, such as standard deviation in disk heat.

FIG. 8C illustrates an embodiment of an UAFE target selection completion scenario. The UAFE target selection is completed when the CAFE 820 is completely filled (e.g., at 100% filled). When the CAFE 820 is completed filled, the CAFE 820 is sealed. After the CAFE 820 is sealed, the CAFE 820 transitions to an SE 810 similar to the SEs 510, 610, and 710. When the CAFE 820 transitions to the SE 810, the physical location of the UAFE 830 is fixed and the UAFE 830 transitions to a CAFE 821 similar to the CAFE 820. A next round of UAFE target selection may begin by repeating the scheme 800. It should be noted that although the scheme 800 employs an objective function base on heat metrics, other suitable objective functions may be employed as determined by a person of ordinary skill in the art to achieve the same functionalities.

Figure 9:
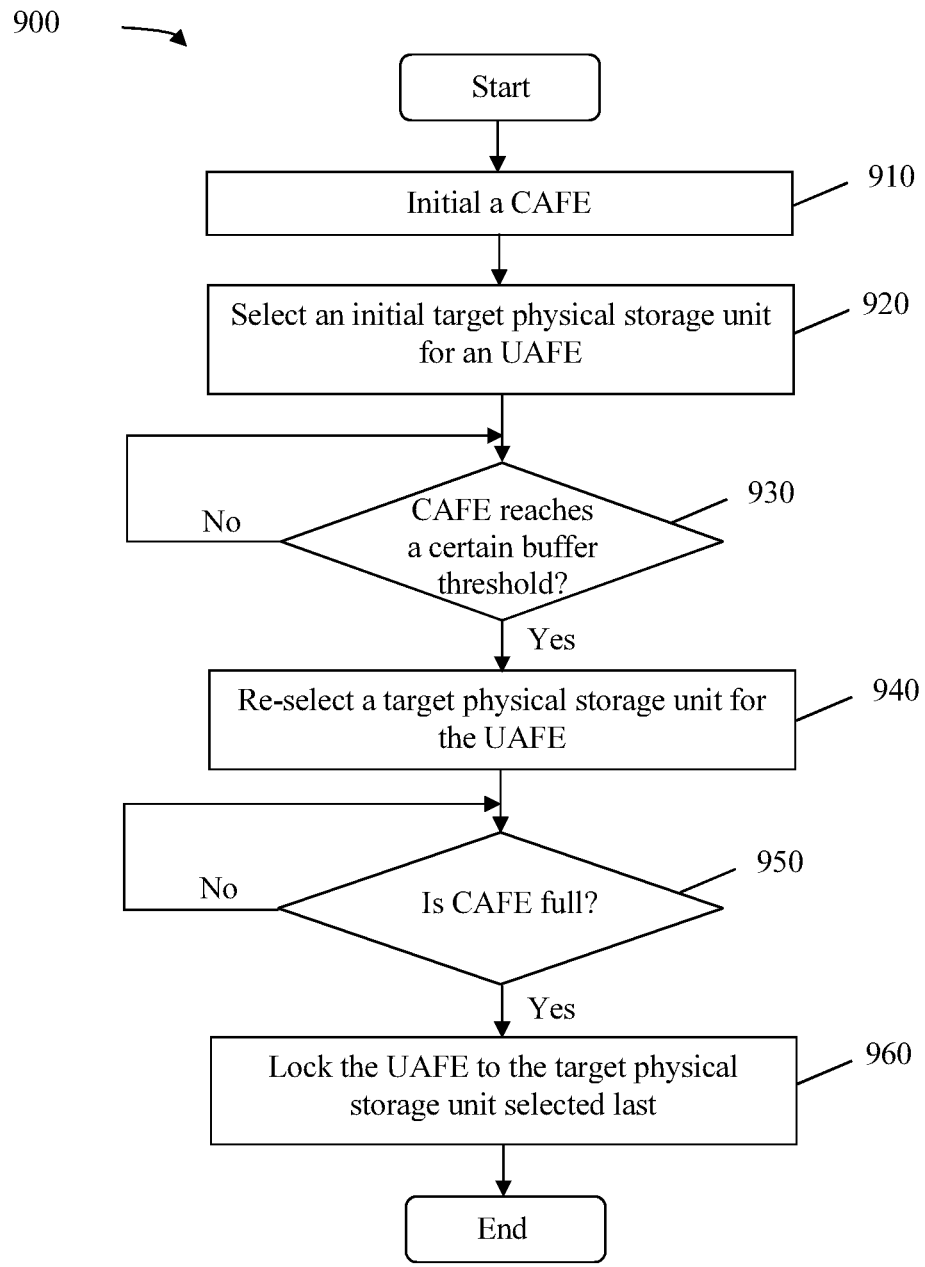
FIG. 9 is a flowchart of an embodiment of a target UAFE selection method.

FIG. 9 is a flowchart an embodiment of a target UAFE selection method 900. The method 900 is implemented by a metadata server, such as the metadata server 140, an elastic storage engine, such as the elastic storage component 141, or an NE, such the NE 400, in a storage network, such as the network 100. The method 900 is implemented when building up a storage entity for a client, such as the client 120. The method 900 employs similar mechanisms as described in the scheme 800. At step 910, a CAFE, such as the CAFEs 520, 620, 720, and 820, is initialized. For example, a data write pointer associated with the storage entity and/or the circular buffer may be configured to point to the beginning of the CAFE. Once the CAFE is initialized, the CAFE may begin to receive data and append data. At step 920, an initial target physical storage unit is selected for an UAFE, such as the UAFEs 530 and 630. For example, the network comprises a plurality of physical storage units and the target physical storage units is selected by optimizing an objective function or a storage metric across the plurality of physical storage units. The storage metric may include storage utilization and storage performance, such as an overall write throughput, a certain percentile of write latency, and/or a certain measure of power saving.

At step 930, a determination is made whether the CAFE reaches a certain buffer threshold (e.g., 30% or 70% filled). If the amount of data stored in the CAFE has not reached the buffer threshold, the step 930 is repeated. If the amount of data stored in the CAFE reaches the buffer threshold, next at step 940, a target physical storage unit is re-selected for the UAFE, for example, by repeating the optimization of the objective function. The re-selection is performed since storage utilization and/or performance of the physical storage units may have changed since the last selection at step 920. It should be noted that steps 930 and 940 may be repeated multiple times at different buffer thresholds to further optimize the selection. In some embodiments, a gradient descent technique or any other optimization technique may be employed to determine an optimized number of iterations and corresponding buffer thresholds.

At step 950, a determination is made whether the CAFE is full. If the CAFE is not full, the step 950 is repeated. If the CAFE is full, next at step 960, the UAFE is locked to the target physical storage unit selected in step 940. When the CAFE is full, the CAFE may be sealed. After the CAFE is sealed, the CAFE transitions to an SE, such as the SEs 510, 610, and 710, and may not receive any further data. When the CAFE transitions to an SE, the UAFE transitions to a CAFE and the method 900 may be repeated to select a next UAFE target location. It should be noted that metadata associated with the storage entity may be updated according to the initial selection and the re-selection of the UAFE target location.

Figure 10A:
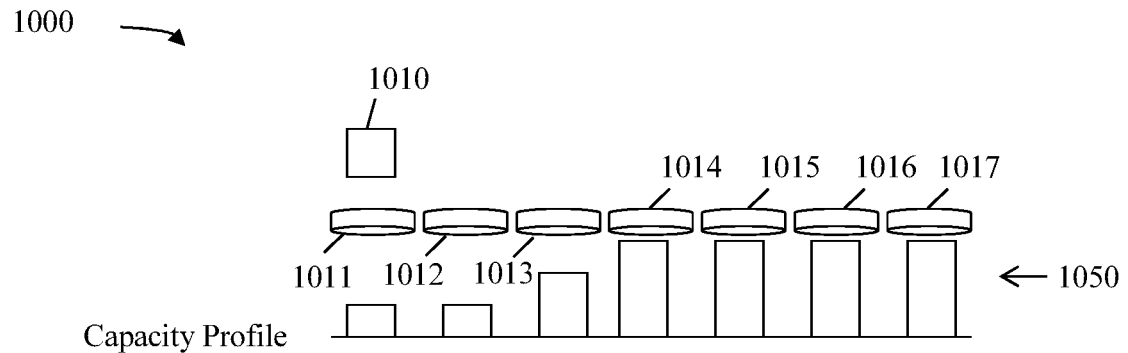
FIG. 10A illustrates an embodiment of a sealed element (SE) selection scenario.
Figure 10B:
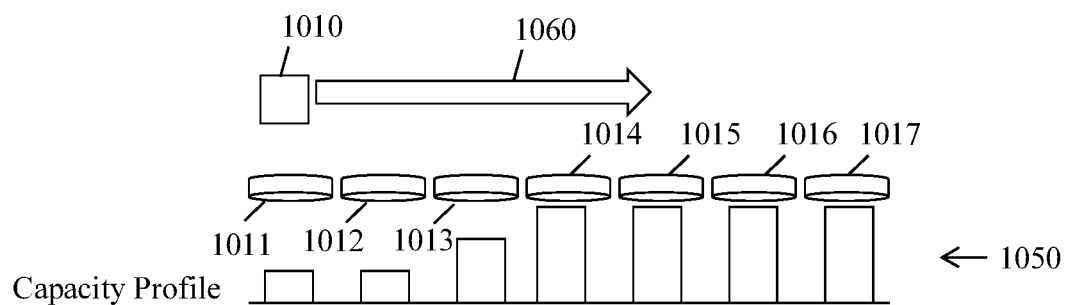
FIG. 10B illustrates an embodiment of a target physical location selection and an SE copy scenario.
Figure 10C:
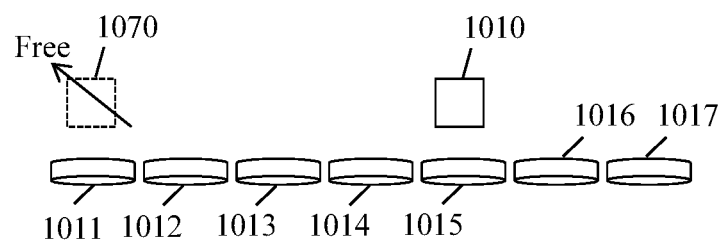
FIG. 10C illustrates an embodiment of a buffer cleanup scenario.

FIGS. 10A-C illustrate an embodiment of an SE relocation scheme 1000. The scheme 1000 is implemented by a metadata server, such as the metadata server 140, in a storage network, such as the network 100. The scheme 1000 is implemented when rebalancing data storage. Rebalancing may be performed to rebalance capacity in a storage system, such as the storage device 130 and the system 300, rebalance read and/or write throughput in the storage system. As shown, the scheme 1000 is applied to a storage device similar to the storage device 130 comprising a plurality of physical storage units 1011, 1012, 1013, 1014, 1015, 1016, and 1017 similar to the physical storage units 210, 311-312, and 811-817. For example, the relocation is determined based on a capacity profile 1050 of the physical storage units 1011-1017. The capacity profile 1050 comprises the amount of capacity available for each of the physical storage units 1011-1017. The scheme 1000 is divided into an SE selection stage, a target physical location selection, an SE copy stage, and a buffer cleanup stage.

FIG. 10A illustrates an embodiment of an SE selection scenario. For example, an SE 1010 that is mapped to the physical storage unit 1011 is selected to be relocated to another physical location. In some embodiments, multiple SEs may be selected for relocation at the same time.

FIG. 10B illustrates an embodiment of a target physical location selection and an SE copy scenario. As shown, the physical storage unit 1015 is selected as the target physical location for the SE 1010 based on the capacity profile 1050, where the physical storage unit 1015 comprises a larger amount of available capacity than the physical storage unit 1011 at which the SE 1010 is currently located. After selecting the physical storage unit 1011, data is copied from the physical storage unit 1011 to the physical storage unit 1015, as shown by the arrow 1060.

FIG. 10C illustrates an embodiment of a buffer cleanup scenario. The buffer clean up stage occurs after all data is copied from the physical storage unit 1011 to the physical storage unit 1015. Upon completing the data copy, the storage (shown as 1070) in the physical storage unit 1011 that is previously assigned to the SE 1010 may be freed or returned back to the physical storage unit 1011. In an embodiment, the metadata server may perform the buffer cleanup in a single transaction. For example, the metadata server updates the metadata associated with the SE 1010 and the physical storage units 1011 and 1015 and returns the storage previously used by the SE 1010 to a free list.

Figure 11:
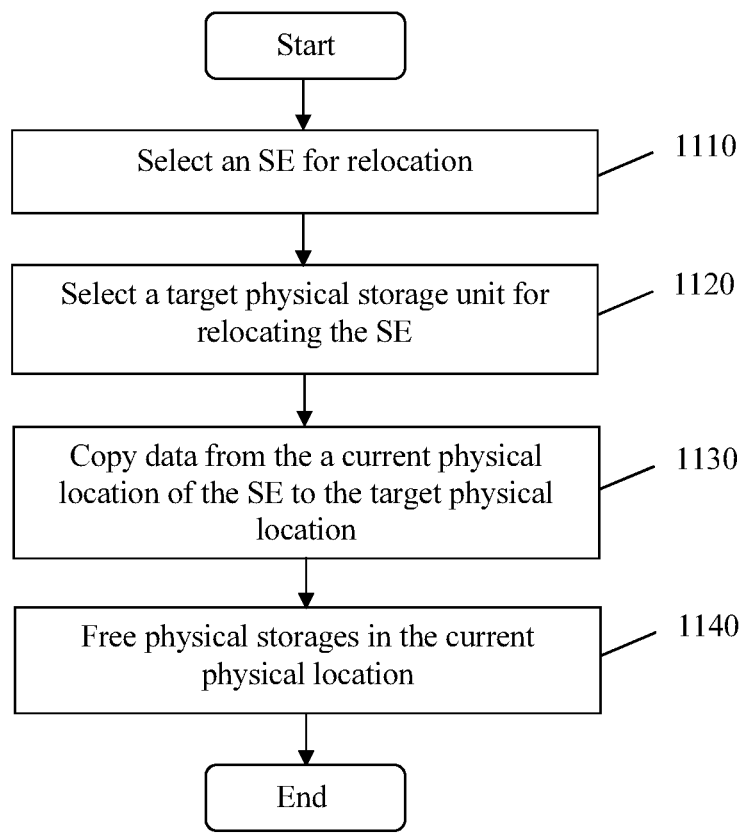
FIG. 11 is a flowchart of an embodiment of an SE relocation method.

FIG. 11 is a flowchart an embodiment of an SE relocation method 1100. The method 1100 is implemented by a metadata server, such as the metadata server 140, an elastic storage engine, such as the elastic storage engine 141, or an NE, such as the NE 400, in a storage network, such as the network 100. For example, the storage network provisions a storage entity for a client, such as the client 120, where the storage entity comprises a logical circular buffer formed by a circularly linked list of logical storage units, such as the logical storage units 220 and 320, distributed over a plurality of physical storage units, such as the physical storage units 210, 311, and 312. The logical circular buffer is similar to the circular buffers 600 or 700 and comprise one or more SEs, such as the SEs 510, 610, 710, and 810. The method 1100 is implemented when rebalancing storage capacity and/or storage performance. The method 1100 employs similar mechanisms as described in the scheme 1000. At step 1110, an SE, such as the SEs 510, 610, 710, and 810, is selected for relocation. For example, the relocation may be initiated because of an additional physical storage unit is added to the network. Alternatively, the relocation may be initiated when planning to exclude a current physical storage unit that is mapped to by the SE from service for power saving or other maintenances. The relocation may also be initiated for rebalancing load distribution. At step 1120, a target physical storage unit is selected for relocating the SE. For example, the target physical storage unit may be selected by optimizing an objective function. The objective function may include storage capacity metrics and/or storage performance metrics associated with the physical storage units. At step 1130, after selecting a target physical storage unit, data stored in the SE is copied from the current physical storage unit to the target physical storage unit. At step 1140, after copying the data to the target physical storage unit, the physical storage corresponding to the SE in the current physical storage unit is freed. It should be noted that metadata associated with the storage entity may be updated according to the SE relocation. In an embodiment, a free list may be employed to track available physical storages.

Figure 12A:
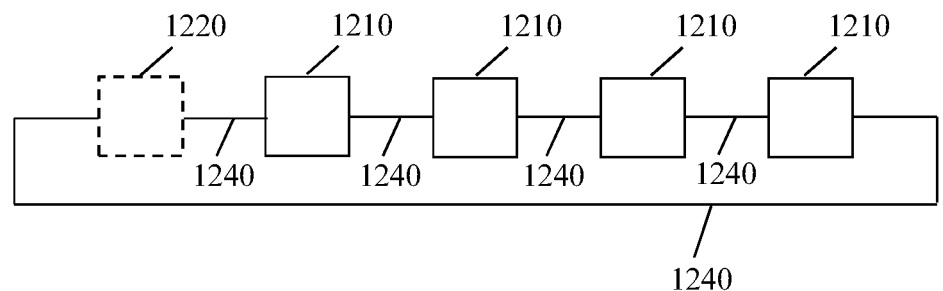
FIG. 12A illustrates an embodiment of a circular buffer.
Figure 12B:
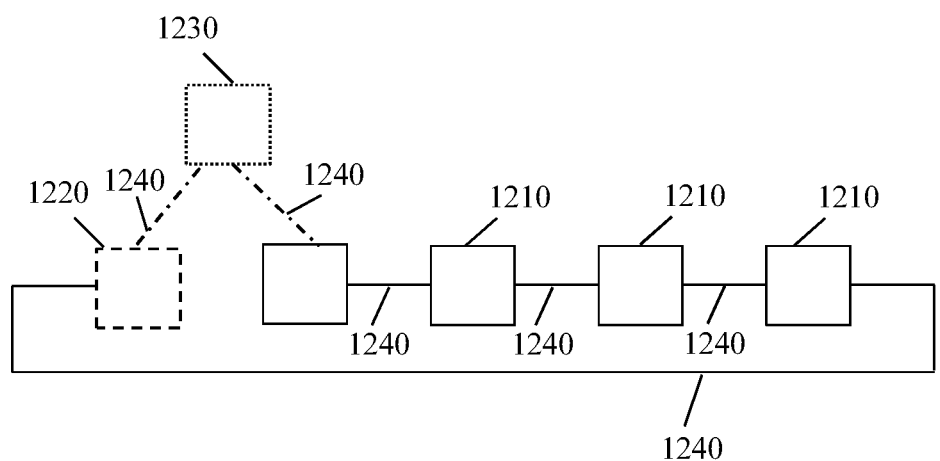
FIG. 12B illustrates an embodiment of an addition of a UAFE to the circular buffer of FIG. 12A.

FIGS. 12A-B illustrates an embodiment of a buffer expansion scheme 1200. The scheme 1200 is implemented by a metadata server, such as the metadata server 140, in a storage network, such as the network 100. The scheme 1200 is implemented when a complete circular buffer, such as the circular buffer 700, is built, for example, for a client such as the client 120, and the client requests for more storage capacity.

FIG. 12A illustrates an embodiment of a circular buffer, which comprises a plurality of SEs 1210 similar to the SEs 510, 610, 710, 810, and 1010 and a CAFE 1220 similar to the CAFEs 520, 620, 720, and 820. The SEs 1210 and the CAFE 1220 are interconnected by a plurality of links 1240 similar to the links 540, 640, 740, 841, and 842, where the links 1240 are metadata stored and maintained by the metadata server.

FIG. 12B illustrates an embodiment of an addition of a UAFE 1230 to the circular buffer of FIG. 12A. As shown, a link 1240 that previously connects the CAFE 1220 to an SE 1210 is removed and additional links 1240 (shown as dashed-dotted lines) are added to include the UAFE 1230. The addition of the UAFE 1230 may be repeated to expand the circular buffer until the circular buffer comprises a desired amount of capacity. It should be noted that the scheme 1200 may employ similar mechanisms as in the scheme 800 when selecting a target physical location for the UAFE 1230. In addition, the metadata server may update metadata associated with the circular buffer when adding the UAFE 1230 to the circular buffer.

Figure 13:
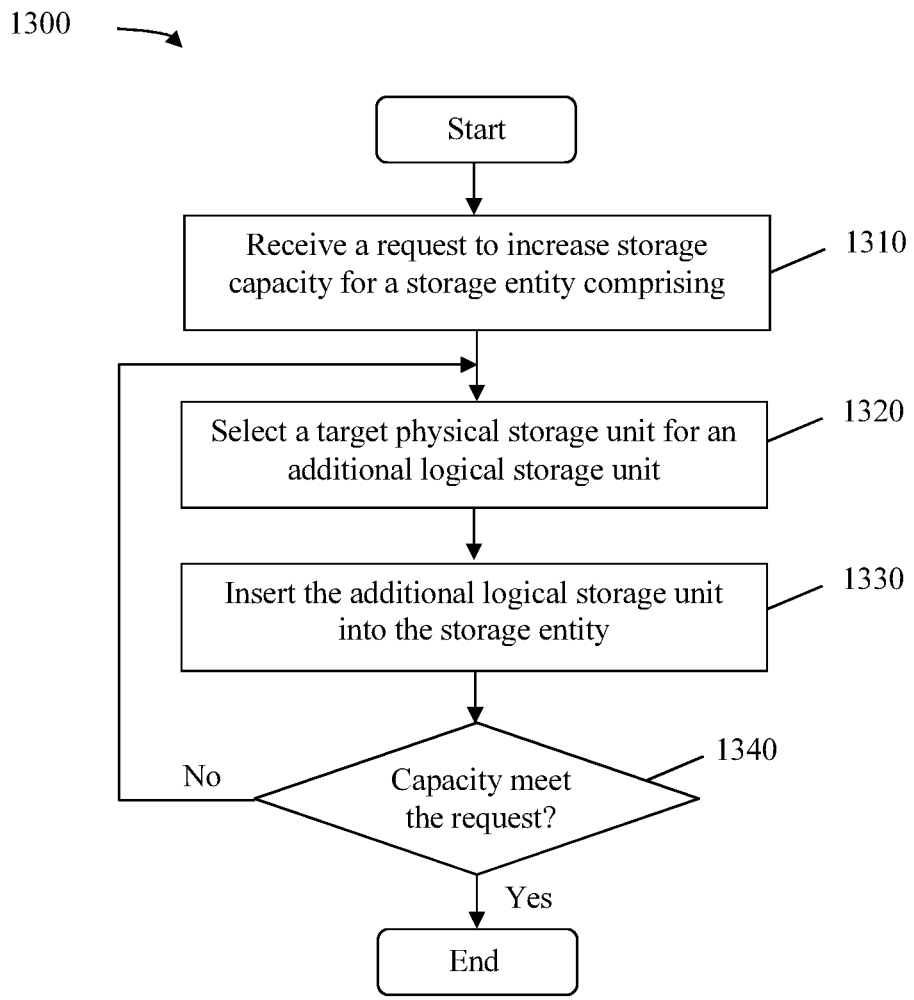
FIG. 13 is a flowchart of an embodiment of a buffer expansion method.

FIG. 13 is a flowchart an embodiment of a buffer expansion method 1300. The method 1300 is implemented by a metadata server, such as the metadata server 140, an elastic storage engine, such as the elastic storage engine 141, or an NE, such as the NE 400, in a storage network, such as the network 100. For example, the storage network provisions a storage entity for a client, such as the client 120, where the storage entity comprises a logical circular buffer formed by a circularly linked list of logical storage units, such as the logical storage units 220 and 320, distributed over a plurality of physical storage units, such as the physical storage units 210, 311, and 312. Storage capacity for an incomplete circular buffer (e.g., the circular buffer 600) may be expanded by updating metadata, for example, a target storage capacity and continually adding additional logical storage units to the incomplete circular buffer. The method 1300 is implemented after a complete circular buffer (e.g., the circular buffer 700) is built. The method 1300 employs similar mechanisms as described in the scheme 1200. At step 1310, a request to increase storage capacity for the storage entity is received, for example, from the client. At step 1320, a target physical storage unit for an additional logical storage unit is selected. At step 1330, the additional logical storage unit is inserted into the storage entity. The additional logical storage unit may be inserted into the logical circular buffer at a position next to a logical storage unit (e.g., the CAFE 1220) referenced by a data write pointer associated with the storage entity. At step 1340, a determination is made whether the storage entity comprises a storage capacity that meets the request. If the storage capacity does not meet the request, the steps of 1320-1340 are repeated. Otherwise, the method 1300 is completed. It should be noted that metadata associated with the storage entity may be updated according to the insertion of the additional storage logical unit. For example, a circular link list that links the logical storage units may be updated to include the additional storage unit.

Figure 14A:
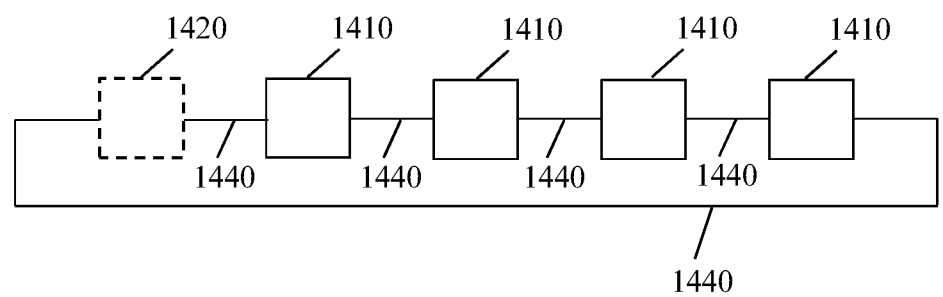
FIG. 14A illustrates another embodiment of a circular buffer.
Figure 14B:
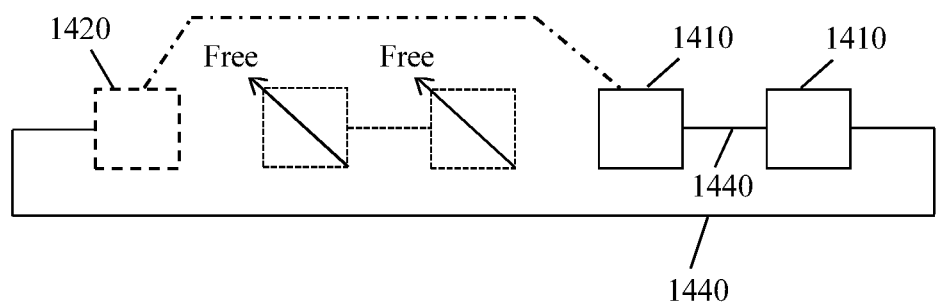
FIG. 14B illustrates an embodiment of removal of SEs from the circular buffer of FIG. 14A.

FIGS. 14A-B illustrates an embodiment of a buffer contraction scheme 1400. The scheme 1400 is implemented by a metadata server, such as the metadata server 140, in a storage network, such as the network 100. The scheme 1400 is implemented when a complete circular buffer, such as the circular buffer 700, is built, for example, for a client such as the client 120, and the client requests to reduce the storage capacity.

FIG. 14A illustrates another embodiment of a circular buffer, which comprises a plurality of SEs 1410 similar to the SE 510, 610, 710, 810, and 1010 and a CAFE 1420 similar to the CAFEs 520, 620, 720, and 820. The SEs 1410 and the CAFE 1420 are interconnected by a plurality of links 1440 similar to the links 540, 640, 740, 841, and 842, where the links 1440 are metadata stored and maintained by the metadata server.

FIG. 14B illustrates an embodiment of removal of SEs 1410 from the circular buffer of FIG. 14B. When the SEs 1410 are removed from the circular buffer, the storages corresponding to the removed SEs 1410 are freed. For example, the metadata server may employ a free list to track the unassigned and/or freed storages. The metadata server may update metadata associated with the circular buffer. For example, the metadata server may update a next buffer pointer for the CAFE 1420 to point to a corresponding SE 1410 after the removal, as shown by a dashed-dotted line. It should be noted that the SEs 1410 that are removed are located immediately after the CAFE 1420, where the data stored in the removed SEs 1410 correspond to the oldest data in the circular buffer. In addition, when the circular buffer is an incomplete circular buffer, such as the circular buffer 600, an UAFE, such as the UAFEs 530 and 630, may be removed from the circular buffer.

Figure 15:
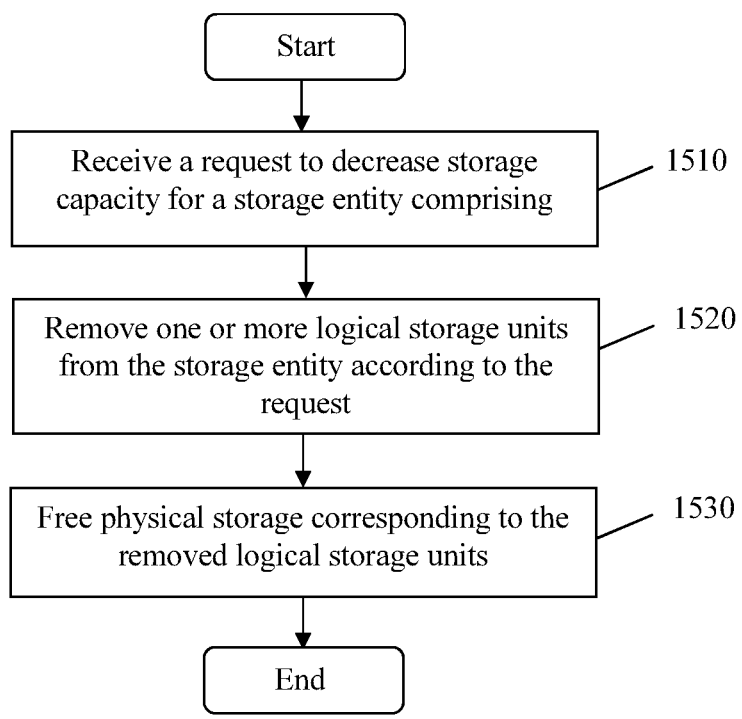
FIG. 15 is a flowchart of an embodiment of a buffer contraction method.

FIG. 15 is a flowchart of an embodiment of a buffer contraction method 1500. The method 1500 is implemented by a metadata server, such as the metadata server 140, an elastic storage engine, such as the elastic storage engine 141, or an NE, such as the NE 400, in a storage network, such as the network 100. For example, the storage network provisions a storage entity for a client, such as the client 120, where the storage entity comprises a logical circular buffer formed by a circularly linked list of logical storage units, such as the logical storage units 220 and 320, distributed over a plurality of physical storage units, such as the physical storage units 210, 311, and 312. The method 1500 employs similar mechanisms as described in the scheme 1400. At step 1510, a request to decrease storage capacity for the storage entity is received, for example, from the client. At step 1520, one or more logical storage units may be removed from the storage entity, for example, by updating a circular link list that links the logical storage units. At step 1530, the physical storage corresponding to the removed logical storage units are freed, for example, by updating a free list that tracks available physical storages.

Figure 16:
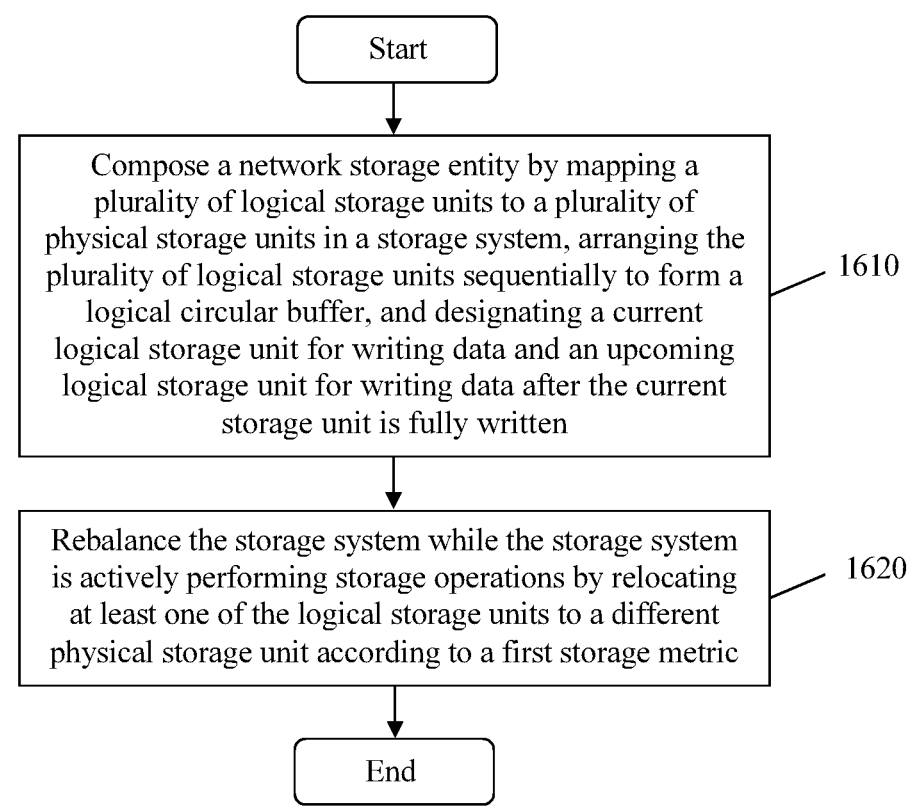
FIG. 16 is a flowchart of an embodiment of an elastic data storage generation method.

FIG. 16 is a flowchart an embodiment of an elastic data storage generation method 1600. The method 1600 is implemented by a metadata server, such as the metadata server 140, an elastic storage engine, such as the elastic storage engine 141, or an NE, such as the NE 400, in a storage network, such as the network 100. The method 1600 begins when a network storage entity is requested, for example, by a client, such as the client 120. At step 1610, a network storage entity is composed by mapping a plurality of logical storage units, such as the logical storage units 220 and 320, to a storage system, such as the storage device 130 and the system 300, comprising a plurality of physical storage units, such as the physical storage units 210, 311, and 312. The network storage entity is further composed by arranging the logical storage units sequentially to form a logical circular buffer, such as the circular buffers 600 and 700. The network storage entity is further composed by designating a current logical storage unit, such as the CAFEs 520, 620, and 720, for writing data and an upcoming logical storage unit, such as the UAFEs 530 and 630, for writing data after the current logical storage unit is fully written. In an embodiment, the network storage entity may be composed as data is received from the client. For example, the network storage entity may be built by initializing a current logical storage unit so that the current logical storage unit is ready to accept data and selecting a target physical storage location for an upcoming logical storage unit by employing similar mechanisms as described in the scheme 800 and the method 900. At step 1620, the storage system is rebalanced while the storage system is actively performing storage operations (e.g., online and in service) by relocating at least one of the logical storage units to a different physical storage unit according to a first storage metric. The first storage metric may include storage utilization, read and/or write throughputs, and/or read and/or write latencies associated with the physical storage units.

Figure 17:
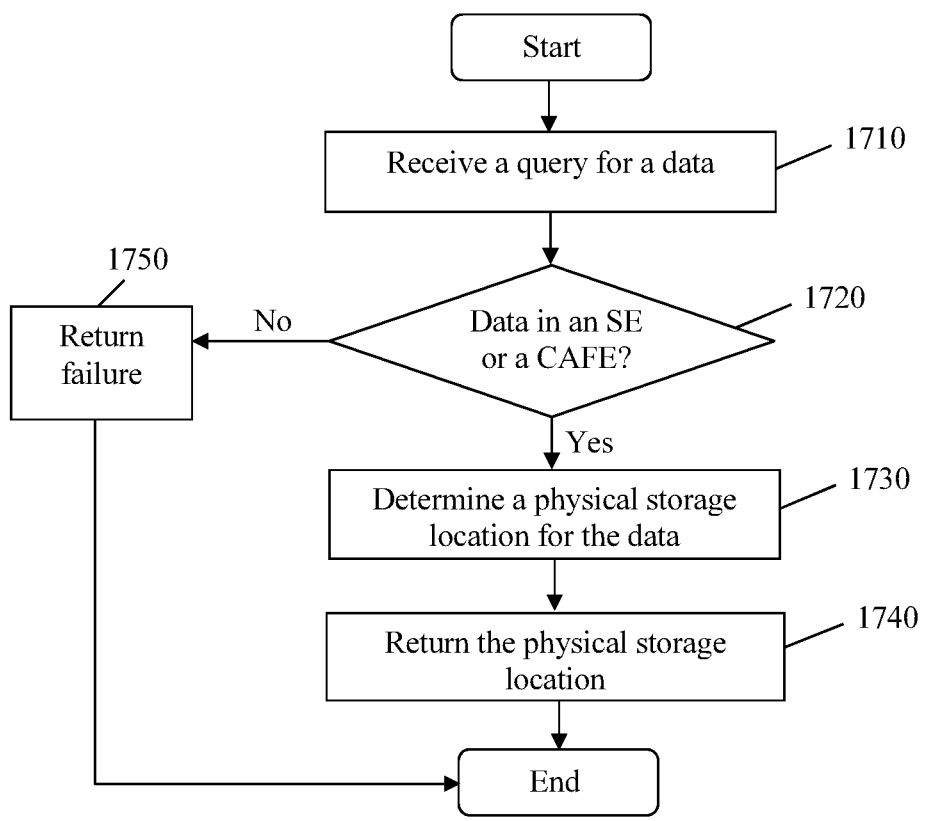
FIG. 17 is a flowchart of an embodiment of a data query method.

FIG. 17 is a flowchart an embodiment of a data query method 1700. The method 1700 is implemented by a metadata server, such as the metadata server 140, or an NE, such as the NE 400, in a storage network, such as the network 100. The method 1700 begins at step 1710 when a query message for a data corresponding to a network storage entity or logical circular buffer, such as the circular buffer 700, is received, for example, by a reader, such as the reader 143, located at the metadata server. At step 1720, a determination is made whether the requested data is located at an SE, such as the SEs 510, 610, 710, 1010, 1210, and 1410 or in a CAFE, such as the CAFEs 520, 620, 720, 820, 1220, and 1420, of the logical circular buffer. If the requested data is not located at an SE or a CAFE, next at step 1750, a failure status is returned. If the requested data is located at an SE or a CAFE, next at step 1730, the physical storage location for the located SE or CAFE is determined, for example, according to a physical-to-logical mapping generated during the composition of the network storage entity and/or logical circular buffer. At step 1740, the physical storage location is returned. It should be noted that queries may access all SEs and all CAFEs. However, an SE that is freed returned to a free list may not be queried until it transitions back to a CAFE or an SE.

As described above, the primitive operations may be executed in parallel and may be employed to compos general-purpose rebalancing mechanisms. Such compositions may incrementally drive a storage system towards better-balanced load distribution. By rebalancing a storage system incrementally, hysteresis effect may be avoided. For example, hysteresis effect may cause target selection to be bounced back-and-forth between two physical storage units. It should be noted that the speed of redistribution and rebalancing of SEs and UAFEs are different. For example, rebalancing SEs may be faster than rebalancing UAFEs.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by a network element (NE) in a network, comprising:
composing a first network storage entity by:
mapping a plurality of logical storage units to a plurality of physical storage units in a physical storage system according to a first storage utilization metric associated with the plurality of physical storage units; and
arranging the plurality of logical storage units sequentially to form a logical circular buffer; and
designating a current logical storage unit for writing data and an upcoming logical storage unit for writing data after the current logical storage unit is fully written; and
selecting a first of the physical storage units as a storage location for the upcoming logical storage unit having optimal storage utilization metric resulted in optimizing an objective function associated with the first storage utilization metric across the plurality of the physical storage units after initializing the current logical storage unit;
rebalancing the physical storage system while the physical storage system is actively performing network storage operations by relocating at least one of the logical storage units to a different physical storage unit has not been mapped to any of the plurality of logical storage units, according to a second storage utilization metric associated with the plurality of storage units; and wherein the logical storage unit is relocated concurrently with composing the first network storage entity.

2. The method of claim 1, further comprising:
receiving data via the network; and
writing the received data into the logical circular buffer by appending the received data to the current logical storage unit which is positioned between a fully written sealed logical storage unit and the upcoming logical storage unit in the logical circular buffer.

3. The method of claim 2, wherein the logical storage unit that is relocated is a sealed logical storage unit.

4. The method of claim 2, wherein composing the first network storage entity further comprises re-selecting a second of the physical storage units as a storage location for the upcoming logical storage unit by repeating an optimization of the objective function when an amount of received data written in the current logical storage unit reaches a certain buffer threshold.

5. The method of claim 1, wherein the logical storage unit is relocated from a first of the physical storage units to a second of the physical storage units, and wherein relocating the logical storage unit comprises:
selecting the second physical storage unit by optimizing an objective function associated with the second storage metric across the plurality of physical storage units;
copying data corresponding to the logical storage unit from the first physical storage unit to the second physical storage unit; and
freeing storage in the first physical storage unit that corresponds to the logical storage unit after copying the data to the second physical storage unit.

6. The method of claim 1, wherein the logical storage unit is relocated when an additional physical storage unit is added to the physical storage system while the physical storage system is operational.

7. The method of claim 1, wherein the logical storage unit is relocated to exclude a physical storage unit that is mapped to the logical storage unit from further service in conjunction with the logical circular buffer.

8. The method of claim 1, wherein the logical storage unit is relocated concurrently with composing the first network storage entity.

9. The method of claim 1, wherein rebalancing the physical storage system further comprises simultaneously relocating the plurality of the logical storage units.

10. The method of claim 1, further comprising composing a second network storage entity by mapping a second plurality of logical storage units to the physical storage system, wherein rebalancing the physical storage system further comprises relocating a logical storage unit in the second network storage entity concurrently with relocating the logical storage unit in the first network storage entity.

11. The method of claim 1, wherein the first storage metric and the second storage metric are associated with storage utilizations of the plurality of physical storage units, read throughputs of the plurality of physical storage units, write throughputs of the plurality of physical storage units, read latencies of the plurality of physical storage units, write latencies of the plurality of physical storage units, or combinations thereof.

12. An apparatus comprising:
a receiver configured to:
  coupled to a plurality of physical storage units in a storage network; and
  receive a storage request message comprising a request to create a network storage entity; and
a processor coupled to the receiver and configured to:
  assign a plurality of logical storage units distributed across the physical storage units to the network storage entity according to the storage request message;
  generate a metadata to associate the network storage entity, the logical storage units, and the physical storage units, wherein the metadata comprises a circular link list that associates the plurality of logical storage units, forming a logical circular buffer, and a mapping between the logical storage units and the physical storage units; and
  designating a current logical storage unit for writing data and an upcoming logical storage unit for writing data after the current logical storage unit is fully written; and
  selecting a first of the physical storage units as a storage location for the upcoming logical storage unit having optimal storage utilization metric resulted in optimizing an objective function associated with the first storage utilization metric across the plurality of the physical storage units after initializing the current logical storage unit;
rebalance the plurality of physical storage units by relocating at least one logical storage unit from a first of the physical storage units to a second of the physical storage units has not been mapped to any of the plurality of the logical units; and
update the metadata according to the relocation of the logical storage unit.

13. The apparatus of claim 12, wherein the metadata further comprises a storage metric associated with a first of the physical storage units, a first uniform resource identifier (URI) that identifies the first physical storage unit, a physical storage address of the first physical storage unit, a status associated with the first physical storage unit, a second URI that identifies a first of the logical storage units that is mapped to the first physical storage unit, a sequence number that associates the logical storage units to the logical circular buffer, or combinations thereof.

14. The apparatus of claim 12, wherein the receiver is further configured to receive a query message for a data, wherein the processor is further configured to:
  determine that the data is located in a logical storage unit within the logical circular buffer; and
  determine a physical storage location for the located logical storage unit, and
  wherein the apparatus further comprises a transmitter coupled to the processor and configured to send the physical storage location in response to the query message.

* * * * *